United States Patent
Ford et al.

(10) Patent No.: US 9,729,917 B2
(45) Date of Patent: *Aug. 8, 2017

(54) BANDWIDTH FLEXIBILITY THROUGH MULTIPLE FREQUENCY CHANNEL DATA DISTRIBUTION

(71) Applicant: Cisco Technology, Inc., San Jose, CA (US)

(72) Inventors: Jeffrey Scott Ford, Madison, AL (US); Jack Thomas Matheney, Madison, AL (US); Leo Montreuil, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,426

(22) Filed: Sep. 29, 2014

(65) Prior Publication Data

US 2015/0020123 A1 Jan. 15, 2015

Related U.S. Application Data

(63) Continuation of application No. 12/342,387, filed on Dec. 23, 2008, now Pat. No. 8,850,509.

(51) Int. Cl.
*H04N 7/18* (2006.01)
*H04N 21/436* (2011.01)
*H04L 12/28* (2006.01)
*H04N 21/4363* (2011.01)

(52) U.S. Cl.
CPC ... *H04N 21/43615* (2013.01); *H04L 12/2801* (2013.01); *H04N 21/43632* (2013.01); *H04N 21/43637* (2013.01)

(58) Field of Classification Search
CPC .......... H04N 7/16; H04N 7/18; H04N 21/436; H04N 21/43637; H04N 21/43632; H04N 21/43615; H04L 12/2801
USPC .............................. 725/81, 85, 151; 370/480
See application file for complete search history.

(56) References Cited

U.S. PATENT DOCUMENTS

| | | | |
|---|---|---|---|
| 7,295,518 B1 | 11/2007 | Monk et al. | |
| 2002/0166124 A1 | 11/2002 | Gurantz et al. | |
| 2005/0068922 A1* | 3/2005 | Jalali | H04J 13/0048 370/335 |

(Continued)

FOREIGN PATENT DOCUMENTS

EP 1924003 A2 5/2008

OTHER PUBLICATIONS

International Search Report & Written Opinion cited in International Application No. PCT/US2009/069274 mailed Nov. 3, 2010, 12 pgs.

(Continued)

*Primary Examiner* — Brian T Pendleton
*Assistant Examiner* — Alan Luong
(74) *Attorney, Agent, or Firm* — Merchant & Gould P.C.

(57) ABSTRACT

An enhanced multimedia over coax alliance (MoCA) implementation having a single Receive (Rx) physical (Phy) module that is arranged to receive data via one of at least two Rx radio frequency (RF) modules, which are arranged to be in communication with a coaxial cable, and at least two transmit (Tx) Phy modules respectively arranged to be in communication with two Tx RF modules, which are also arranged to be in communication with the coaxial cable.

20 Claims, 10 Drawing Sheets

(56) References Cited

U.S. PATENT DOCUMENTS

| | | |
|---|---|---|
| 2008/0247334 A1 | 10/2008 | Lee et al. |
| 2009/0010263 A1 | 1/2009 | Ma et al. |
| 2009/0092154 A1* | 4/2009 | Malik ............... H04L 12/2861 370/480 |
| 2009/0165070 A1 | 6/2009 | McMullin et al. |
| 2009/0232103 A1* | 9/2009 | Kesselman ............ H01Q 3/26 370/336 |
| 2009/0252172 A1* | 10/2009 | Hare ............... H04L 12/5695 370/400 |
| 2009/0254794 A1* | 10/2009 | Malik ............... H04L 1/0041 714/776 |
| 2009/0303876 A1 | 12/2009 | Wu |
| 2010/0031297 A1* | 2/2010 | Klein ................. H04L 12/12 725/78 |
| 2010/0100918 A1 | 4/2010 | Egan et al. |

OTHER PUBLICATIONS

Forms >>US Telco Support >>Verizon>>Verizon Fiber Optics>>[net] D-LINK Introduces MOCA bridge, May 31, 2008, http://www.dslreports.com/forum/r20604906-net-DKLINK-Introduces-MOCA-bridge, XP002605702 , 4 pgs.

Todd Spangler, "MoCA Brewing Up Bigger Bandwidth," Multichannel News, Dec. 15, 2008, http://www.multichannel.com/article/160878-MoCA_Brewing_Up_Bigger_Bandwidth.php, XP-002605703, 3 pgs.

"Data Over Cable Service Interface Specifications," Physical Layer Specification, DOCSIS 3.0, May 22, 2008, pp. 95-96, XP002605704, http://www.cablelabs.com/specifications/CM-SP-PHYv3.0-I07-080522.pdf.

\* cited by examiner

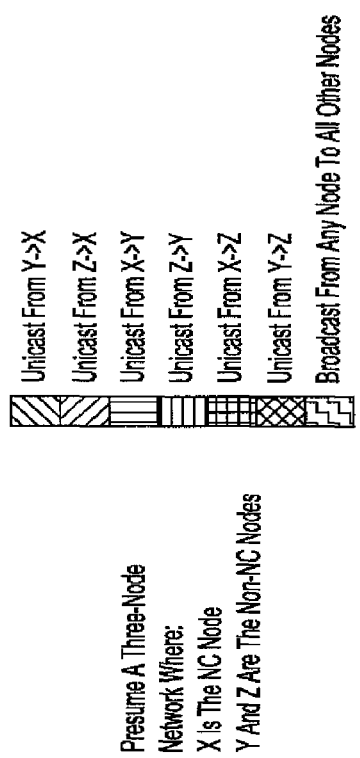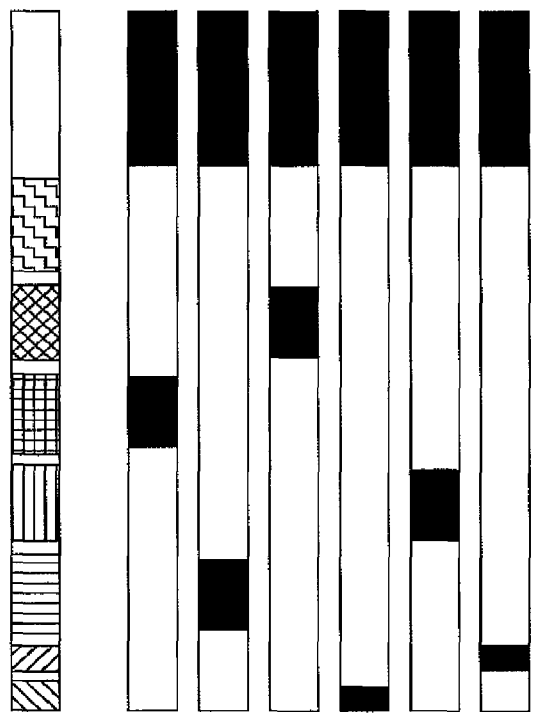
FIG.8

BANDWIDTH FLEXIBILITY THROUGH MULTIPLE FREQUENCY CHANNEL DATA DISTRIBUTION

CROSS-REFERENCE TO RELATED APPLICATION

This application is a continuation of U.S. patent application Ser. No. 12/342,387, filed Dec. 23, 2008, now U.S. Pat. No. 8,850,509, issued Sep. 30, 2014, which is incorporated herein by reference in its entirety.

TECHNICAL FIELD

The present disclosure relates to distribution of data over a network using multiple frequency channels.

BACKGROUND

Multimedia over Coax Alliance (MoCA) is a group of companies working to develop and promote a communications protocol targeted at distributing high-bandwidth isochronous data over a home network using coaxial cable as the communications medium. The protocol developed by the alliance is also known as MoCA. MoCA uses one of the devices in its network (the Network Coordinator) to establish a Time Division Multiple Access (TDMA) schedule that all nodes in the network follow. All nodes in a MoCA network communicate on a single 50 MHz frequency band, selected from within and range of center frequencies covering 875 to 1500 MHz. Several products, including set top boxes, routers and gateways, and bridges, that operate in accordance with the MoCA protocol are currently available on the market. MoCA specification versions 1.0 and 1.1 have been submitted to the International Telecommunications Union (ITU), and are incorporated herein by reference.

BRIEF DESCRIPTION OF THE DRAWINGS

FIG. 8 shows scheduling constraints introduced by limiting a MoCA device to using a single Rx PHY at each node in accordance with the present invention;

DESCRIPTION OF EXAMPLE EMBODIMENTS

Overview

Embodiments of the present invention provide the ability, in a MoCA network, to allow two overlapping transmissions on two separate 50 MHz channels. In an example implementation, a given node in the network can receive on either of the two 50 MHz channels, but not on both channels simultaneously. This configuration improves the aggregate throughput of a conventional MoCA network for some usage models by up to 80%, without requiring significant increases in implementation cost.

Figure 1:
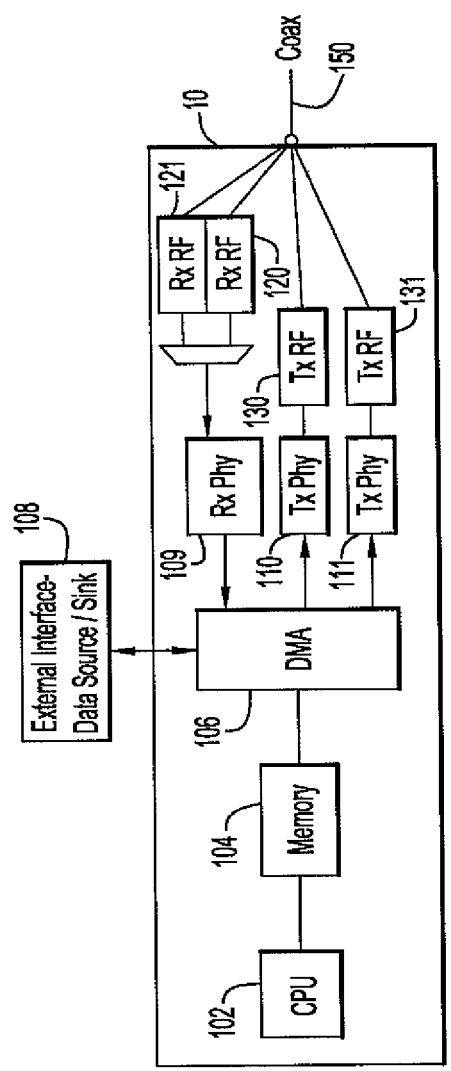
FIG. 1 is a block diagram of a system in accordance with an embodiment of the present invention.

Embodiments of the present invention may be referred to herein as "Turbo MoCA" in that implementations thereof may significantly increase the throughput of a conventional MoCA network operating in accordance with MoCA specification version 1.0 and 1.1 available via the International Telecommunications Union (ITU) (referred to herein as "conventional MoCA"). FIG. 1 is a block diagram of a system 10 in accordance with an embodiment of the present invention. System 10 includes a central processing unit (CPU), or processor, 102, memory 104, and direct memory access (DMA) module 106. DMA module 106 is in communication with external interface, data source/sink module 108. Module 108 may be in communication with, for example, a hard drive of a computer, a server memory of a digital video recorder (DVR), or virtually any other device or network connection that can deliver data that may be transmitted across a MoCA network.

Turbo MoCA device 10 further includes a single Receive (Rx) Physical (Phy) module 109, two transmit (Tx) Phy modules 110 (one of which is included in a conventional arrangement) and 111 (added in accordance with the present invention). Also included in system 10 is a conventional Rx radio frequency (RF) path 120 (RF modulator/demodulator), and an additional Rx RF path 121, along with a conventional Tx RF path 130 (RF modulator/demodulator) and an additional Tx RF path 131, the latter being in communication with Tx Phy 111, whereas Tx RF path 130 is in communication with Tx Phy 110. As will be explained in more detail later herein, system 10 receives on only one channel at a time. Consequently, the Rx RF paths 120, 121 are switched into Rx Phy 109 as appropriate. Each of the Rx RF and Tx RF paths 120, 121, 130, 131 is in communication with a single coaxial cable 150 that comprises a segment of a coaxial network.

Figure 2:
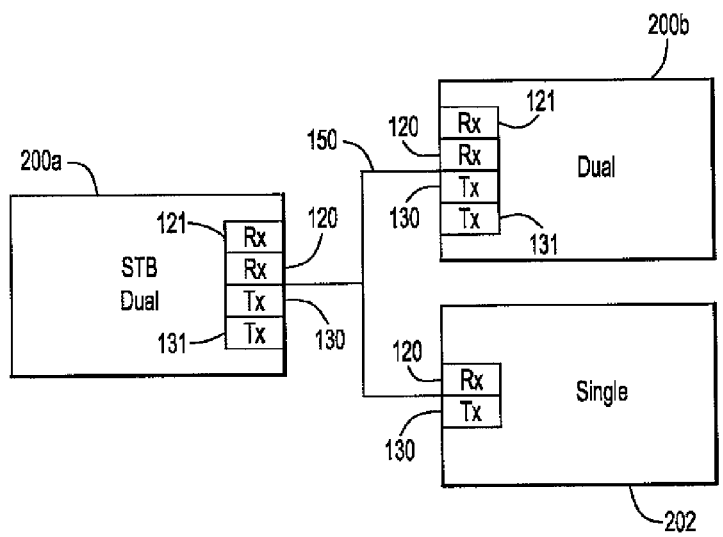
FIG. 2 shows how conventional MoCA devices and a MoCA device in accordance with the present invention can operate in the same network.

FIG. 2 shows how conventional MoCA devices and a "Turbo" MoCA device in accordance with the present invention can operate in the same network. As shown, a first set top box (STB) 200a is in communication with a headend of cable service provider, and that STB 200a incorporates the features of the present invention, namely the possibility to operate in accordance with MoCA using multiple channels indicated by the multiple Rx and Tx paths shown. STB 200a can thus communicate with another similar STB (or other device) 200b that also has the Turbo MoCA ability. On the other hand, a conventional device 202, such as an STB, may be provisioned with conventional MoCA capabilities. Nevertheless, the other devices in the coaxial network can still communicate with that conventional device using conventional MoCA protocols and capabilities.

Figure 3:
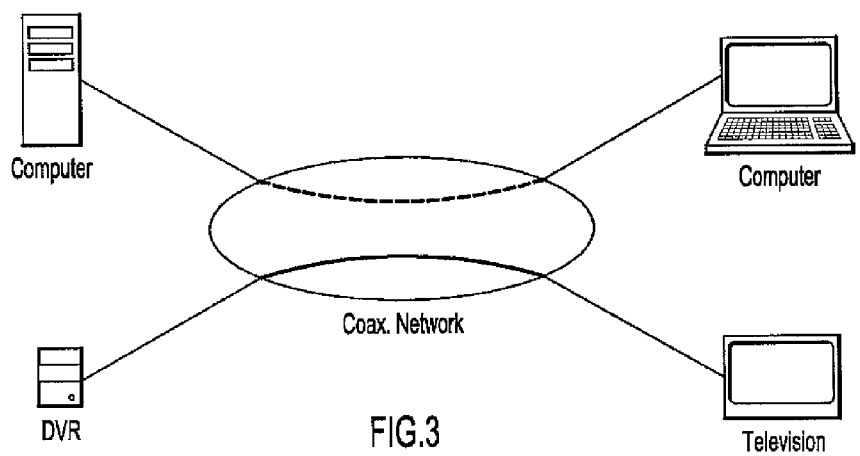
FIG. 3 illustrates a network usage case where the system in accordance with the present invention allows two parallel paths through a MoCA network.

Turbo MoCA improves network throughput of at least two common traffic patterns. First, two MoCA devices (e.g., 200a, 200b) are able to stream high-bandwidth traffic to non-overlapping destination nodes without significantly interfering with each other. An example of such a traffic pattern is a digital video recorder (DVR) transmitting to a remote display device while a computer is simultaneously sending a large file across the MoCA network. This is illustrated in FIG. 3.

Figure 4:
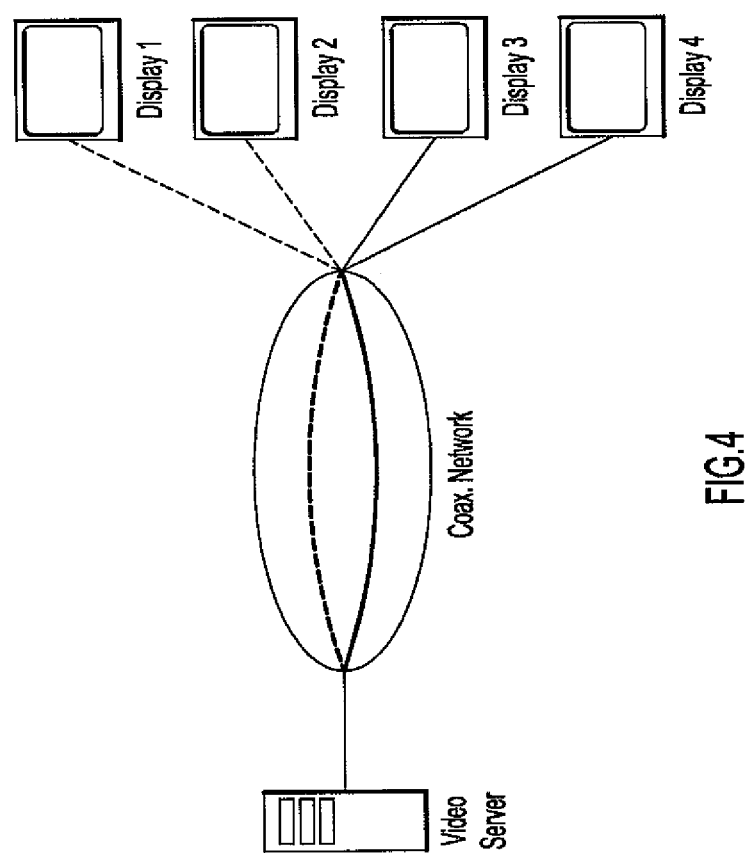
FIG. 4 illustrates a network usage case where MoCA devices in accordance with the present invention increase the bandwidth available to a video server for distributing multiple streams of content to multiple destinations.

Second, a single MoCA device can send multiple high-bandwidth traffic streams to non-overlapping destination nodes at a higher throughput than is available in a standard MoCA network. An example of such a traffic pattern is a video server sending multiple independent video streams to multiple independent display devices. This is illustrated in FIG. 4. Thus, those skilled in the art will appreciate the advantages of Turbo MoCA, further details of which are described below.

Several extensions to the standard MoCA protocol (i.e., versions 1.0 and 1.1) are employed to enable Turbo MoCA. These extensions include Channel Selection, Device Calibration, Channel Characterization, Packet Scheduling, and Bandwidth Prediction. Each subject is addressed in turn below. Processor 20 and memory 104 as necessary are primarily responsible for implementing the extensions described below.

Channel Selection

Figure 5:
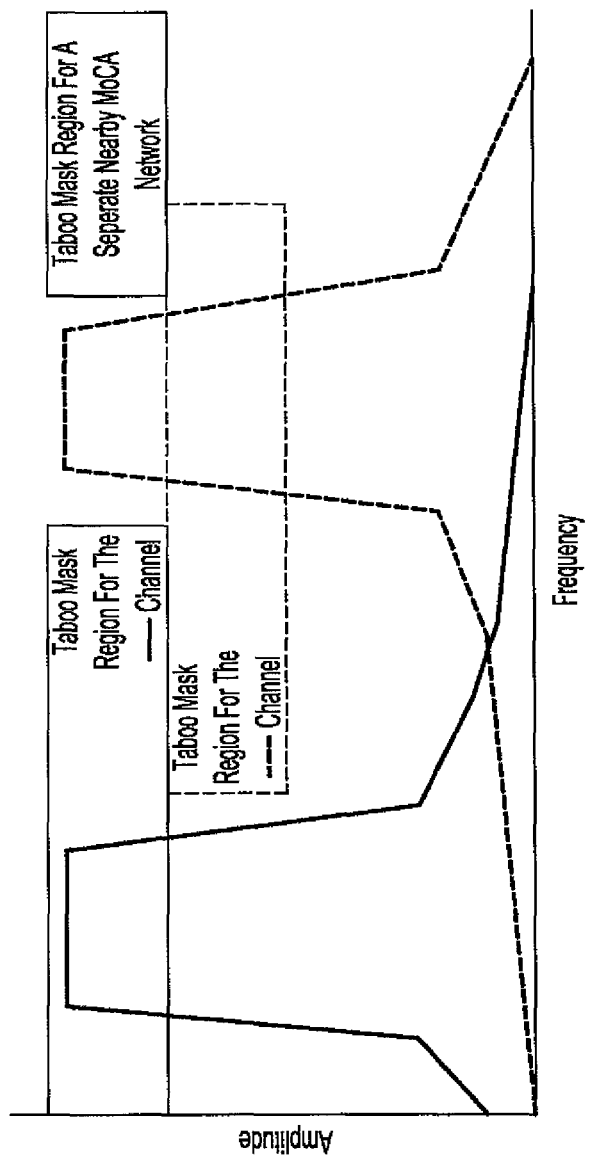
FIG. 5 shows the spectrum allocation for MoCA devices in accordance with the present invention.

As shown in FIG. 5, MoCA defines a protocol for nodes to select a common operating frequency from a subset of all available MoCA operating frequencies. After such a selection is made, a set of frequencies adjacent to the selected frequency are marked as taboo, indicating that other MoCA networks should not form on these adjacent frequencies. Each node in a MoCA network defines a set of taboo frequencies depending on its channel selectivity and on presumed characteristics of other MoCA devices in the network. The purpose of the taboo frequencies is to prevent one MoCA network from interfering with another nearby network operating on a different frequency.

Turbo MoCA extends the channel selection process by establishing a second operating frequency (arbitrarily designated channel B) that is compatible with the previously-established primary channel (arbitrarily designated as channel A). The channel B frequency is selected to reduce interference with channel A (and vice versa) below an acceptable threshold.

Device Calibration

MoCA uses a version of Orthogonal Frequency Division Modulation (OFDM) known as Adaptive Constellation Multi-Tone (ACMT). This modulation method is susceptible to degradation by a variety of causes, including amplitude compression (lack of dynamic range), and I/Q imbalance (different gain and/or phase characteristics associated with the Tx and Rx circuitry that processes the In-phase and Quadrature components of the baseband signal). To minimize such degradations, MoCA defines a variety of messages, probes, and loop-back opportunities that nodes use to measure and correct for such degradations.

Because Turbo MoCA uses separate RF hardware to transmit and receive on channel A and channel B (e.g., Rx RF 121 and Tx RF 131), the degradations described above must be separately characterized on channel B. Turbo MoCA makes use of capabilities described in existing MoCA specifications to define new control messages, probes, and loop-back opportunities, as well as a sequence of such events, used to calibrate the additional hardware used to support channel B. Specifically, Turbo MoCA uses the Layer Two Management Entity (L2ME) messages and Protocol Information Elements (PIE) to facilitate channel B calibration.

The channel B calibration is similar to the channel A calibration defined by MoCA, but specialized in several ways. First, standard MoCA requires all nodes be able to transmit and receive. Turbo MoCA can be asymmetrical in that a given node might use channel B only for transmit operations, while another node might use channel B only for receiver operations. Therefore Turbo MoCA separates the Tx and Rx calibration sequences to avoid unnecessary calibration steps.

Second, standard MoCA uses a very robust, low-bandwidth modulation method called Diversity Mode to exchange data between uncalibrated nodes. Turbo MoCA performs channel B calibration after channel A has been fully characterized, allowing devices to communicate more efficiently using high-bandwidth messages over channel A while coordinating the sequence of events required to calibrate the channel B hardware. Avoiding the Diversity Mode during channel B accelerates the calibration process.

Figure 6:
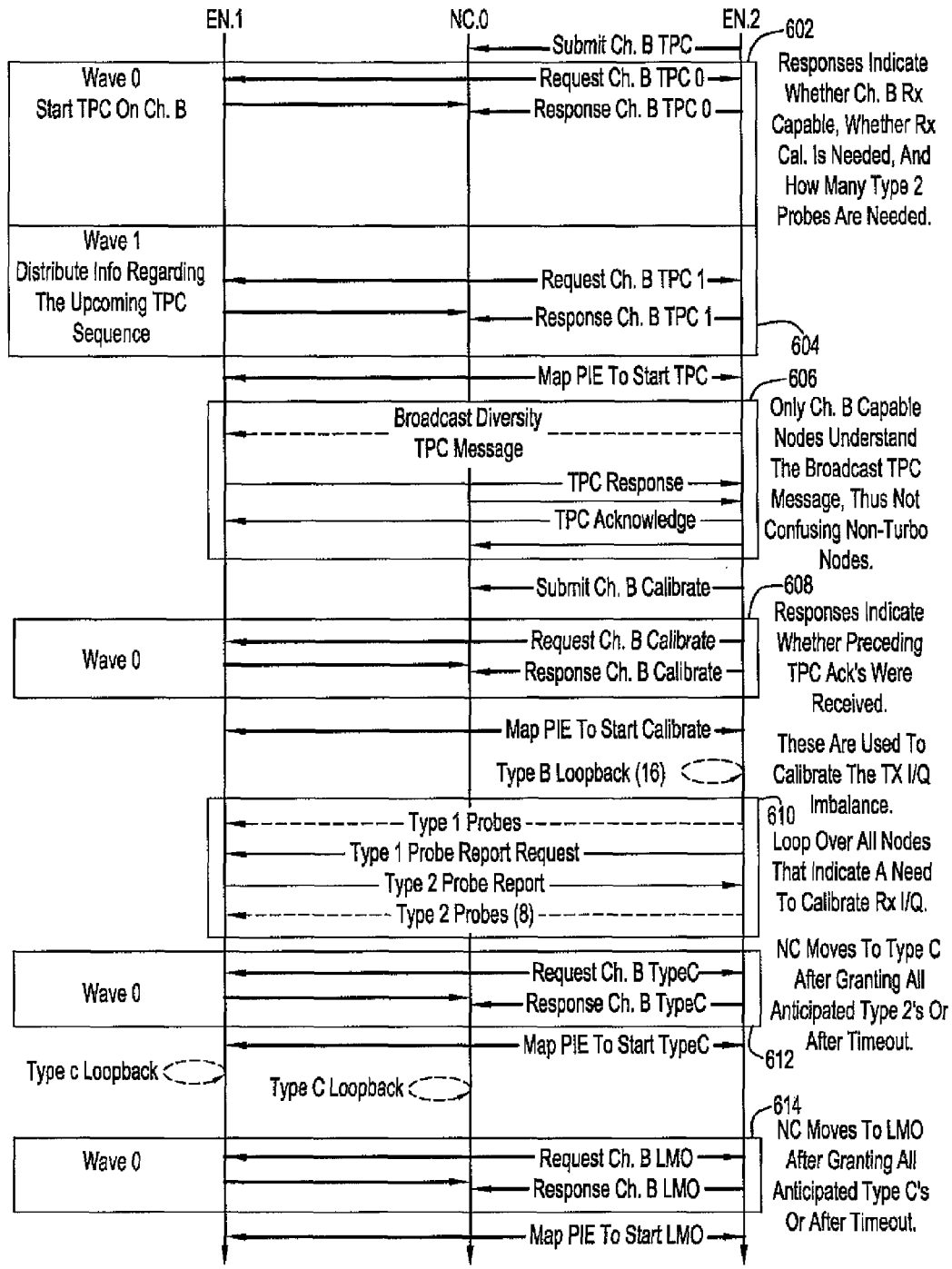
FIG. 6 shows control frames exchanged during calibration of MoCA devices in accordance with the present invention.

An overview of the sequence of events associated with channel B calibration is depicted in FIG. 6. In this figure the node labeled EN.2 is executing a sequence of events to calibrate its own Tx circuitry and the Rx circuitry of nodes EN.1 and NC.0.

More specifically, the sequence begins with node EN.2 sending a Submit Ch. B Transmit Power Control (TPC) message to the network control node NC.0. In response, as shown in sequence 602, NC.0 sends a Request Ch. B TPC 0 message to all nodes, which respond in kind.

Then, in sequence 604, information is distributed regarding an upcoming TPC sequence, which is initiated with a Medium Allocation Plan (MAP) Protocol Information Element (PIE) to start TPC sent by NC.0.

During sequence 606, EN.2 sends a Broadcast Diversity TPC message on channel B. Of course, only those nodes that are channel B enabled will respond. Responses are received and acknowledgements sent over channel A.

Thereafter, a Submit Ch. B Calibrate message is sent of over channel A. Sequence 608 illustrates NC.0 sending a Request Ch. B Calibrate message to all nodes, and receiving corresponding responses from EN.1 and EN.2, again over channel A.

After sequence 608, NC.0 sends a Map PIE start Calibrate message and EN.2 performs Type B Loopback to calibrate transmit I/Q imbalance.

In sequence 610, Type 1 probes are sent over channel B by EN.2 and a Type 1 Probe Report Request is sent over channel A. A Type 2 Probe Report is returned by EN.1 over channel A and Type 2 Probes are sent by EN.2 over channel B.

In sequence 612, NC.0 sends a Request Ch. B Type C message and EN.1 and EN.2 respond in kind. Thereafter, NC.0 sends a Map PIE to start Type C, which causes EN.1 and NC.0 to perform Type C Loopbacks over channel B, as shown. Then, in sequence 614, NC.0 sends a request Ch. B Link Maintenance Operation (LMO) to nodes EN.1 and EN.2, resulting in LMO responses from each of EN.1 and EN.2. Finally, NC.0 sends a Map PIE to start LMO.

Channel Characterization

The network of coaxial cable and splitters over which MoCA devices communicate degrades the MoCA signal through attenuation and reflection. Standard MoCA defines a set of packets and probes used to characterize these aspects of the MoCA communications medium and to optimize and refine performance in such an environment.

Figure 7:
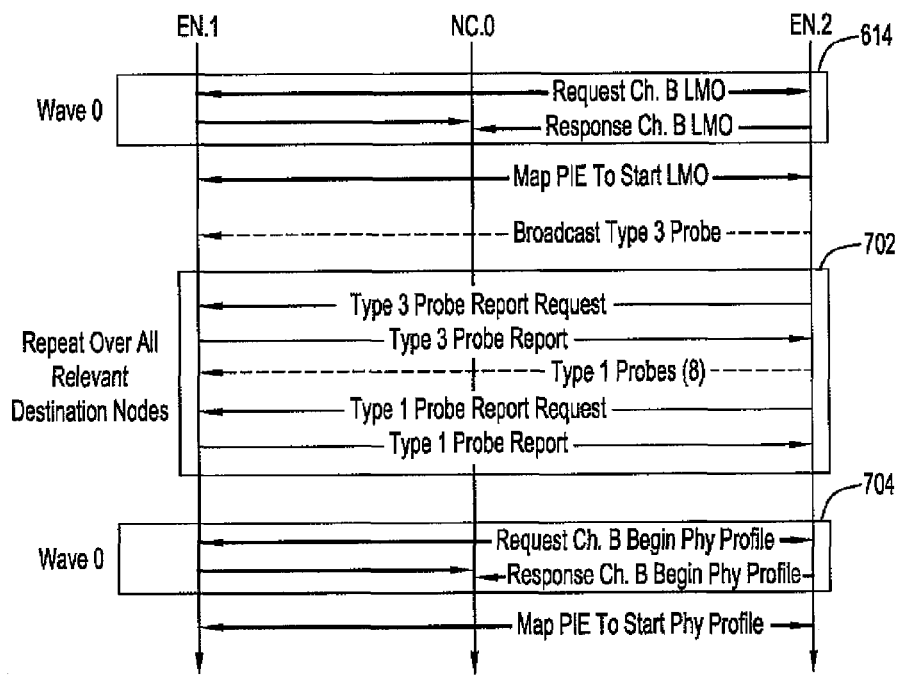
FIG. 7 shows control frames exchanged during channel characterization in accordance with the present invention.

Turbo MoCA uses a similar sequence of packets and probes to separately optimize performance at the channel B frequency. As described earlier, Turbo MoCA allows asymmetric communication over channel B. The channel B characterization sequence is therefore a modified version of the channel A characterization sequence employed by standard MoCA. The channel B characterization sequence is depicted in FIG. 7.

More specifically, as shown, sequence 614 depicted in FIG. 6 is re-presented along with the Map PIE to start LMO message. Thereafter, EN.2 sends a Broadcast Type 3 Probe over channel B. In sequence 702, a Type 3 Probe Request is sent over channel A, and a Type 3 Probe Report is received in return from EN.1, again over channel A. Type 1 probes are then sent over channel B by EN.2, and a Type 1 Probe Report Request follows on channel A. EN.1 then supplies a Type 1 Probe Report, also over channel A.

In sequence 704, NC.0 sends a Request Ch. B Begin Phy Profile message and each non-controller node responds. This sets up NC.0 to send a Map PIE start Phy Profile message.

Packet Scheduling

Because the two operating frequencies used by Turbo MoCA are not completely independent—nodes can only receive on a single frequency at any given time—the Network Coordinator (NC) must allocate transmission bandwidth for both channel A and channel B in a single algorithm. In MoCA, bandwidth allocation is described by a Link Control Frame known as a MAP (Media Access Plan) frame. The Turbo MoCA MAP-generation algorithm running in the NC simultaneously constructs MAPs that define transmission opportunities on both channel A and channel B. Some of the unique aspects of a Turbo MoCA MAP-generator algorithm are avoiding conflicting overlaps of Tx/Rx operations, flexibility of bandwidth requests with regard to transmission frequency, and maintaining proper delivery order of data packets.

Conflict Avoidance

Hardware extensions associated with Turbo MoCA result in the following scheduling constraints:

A node can unicast to 0, 1, or 2 nodes at a given time

A node can receive from 0 or 1 nodes at a given time

A node cannot simultaneously transmit and receive

FIG. 8 illustrates some of the constraints placed on the Turbo MoCA MAP generator with regard to avoiding transmission and reception conflicts. In FIG. 8, the two transmissions (Y.fwdarw.X and Z.fwdarw.X) at the beginning of the MAP cycle are typically Reservation Request frames, used by nodes Y and Z to request transmission bandwidth in subsequent MAP cycles. The single broadcast frame in this example would be a MAP transmitted from node X to all other nodes, but for the purpose of determining channel conflicts could be any broadcast packet. The region at the end of the MAP cycle is unallocated on channel A, and is therefore available on channel B for use by any (but not all) of the remaining nodes.

Bandwidth Request Flexibility

To request transmission bandwidth, a MoCA node constructs a Reservation Request frame that consists of a series of Request Elements. Each request element describes the details of the requested transmission opportunity, including its duration, the destination node, its priority, and the packet type to be transmitted. A node determines the duration of a transmitted packet using a MoCA-specified calculation that factors in the number of bytes to be transmitted and various details of the ACMT modulation it uses to transmit to the intended destination node. When a Turbo MoCA node requests transmission bandwidth, it ideally requests bandwidth in such a way that it is prepared to transmit on either channel A or channel B. The NC node, since it understands the bandwidth demands of all nodes in the network, makes the determination as to whether a specific transmission is allocated on channel A or channel B.

Several extensions to the standard MoCA protocol are employed to support this flexibility of channel selection. First, a Reservation Request (RR) Protocol Information Element (PIE) is used to request the bandwidth. The use of a customized PIE allows communication of additional information (profile sequence for each of channels A and B) needed to support Turbo MoCA, and eliminates other information that is not needed (Request ID—see the section below on Bandwidth Prediction for more information).

Second, the requesting node calculates the duration of the packet as transmitted on both channel A and on channel B, and uses the longer of the two durations when requesting bandwidth. If the bandwidth grant occurs on the channel with the lower PHY rate, the duration of the request will have been exactly correct. If the bandwidth grant occurs on the faster of the two channels, a slight inefficiency is introduced because the node will have reserved more time for the transmission than is required. Generally the PHY rate achieved on each of channel A and channel B will be similar enough to make such inefficiency acceptable. If the PHY rates are very dissimilar, an alternative method is to specify both durations in the reservation request, with a new inefficiency introduced in the form of more bytes required to construct the Reservation Request packet.

Third, the NC uses a MAP PIE to grant bandwidth on channel B, rather than using a standard MAP Allocation Unit. The reason for using a MAP PIE is to maintain compatibility with non-Turbo MoCA devices that may be in the network. Vendor-specific MAP PIEs are ignored by any device that does not understand the purpose of the PIE as defined by the vendor. The MAP PIE is transmitted as part of the standard MAP packet on channel A, rather than as a separate channel-B MAP packet transmitted on channel B. The reasons for communicating all information regarding bandwidth grants in the single MAP packet are to minimize the conflict introduced by broadcast packets, and to reduce the redundant information that would appear in two separate MAP packets. A broadcast packet on channel B (i.e. a second MAP packet) precludes simultaneous transmissions on channel A in the same way that a broadcast packet on channel A precludes simultaneous transmissions on channel B.

Order of Delivery Maintenance

MoCA requires that Ethernet packets with a common source/destination/priority must be delivered into the MoCA network in the same order in which they arrived at the MoCA device. When the NC grants bandwidth for overlapping transmissions on two frequencies, the order of transmission can be ambiguous or even incorrect. This problem could be addressed by including a sequence number in the bandwidth grant to indicate the proper re-ordering that must be performed at a receiving node, should the bandwidth allocation be such that packets are delivered out of order. However, such a mechanism places a high burden on the receiving node to buffer and sort packets as they are received from the MoCA network.

The preferred method for ensuring proper delivery of Ethernet frames is to constrain the Turbo MoCA MAP generation algorithm such that all transmissions of a given source/destination/priority are granted on either channel A or channel B. This method does not adversely impact the throughput of a Turbo MoCA network because the only opportunities it provides for increased throughput are for overlapping transmissions to distinct destination nodes.

Figure 9:
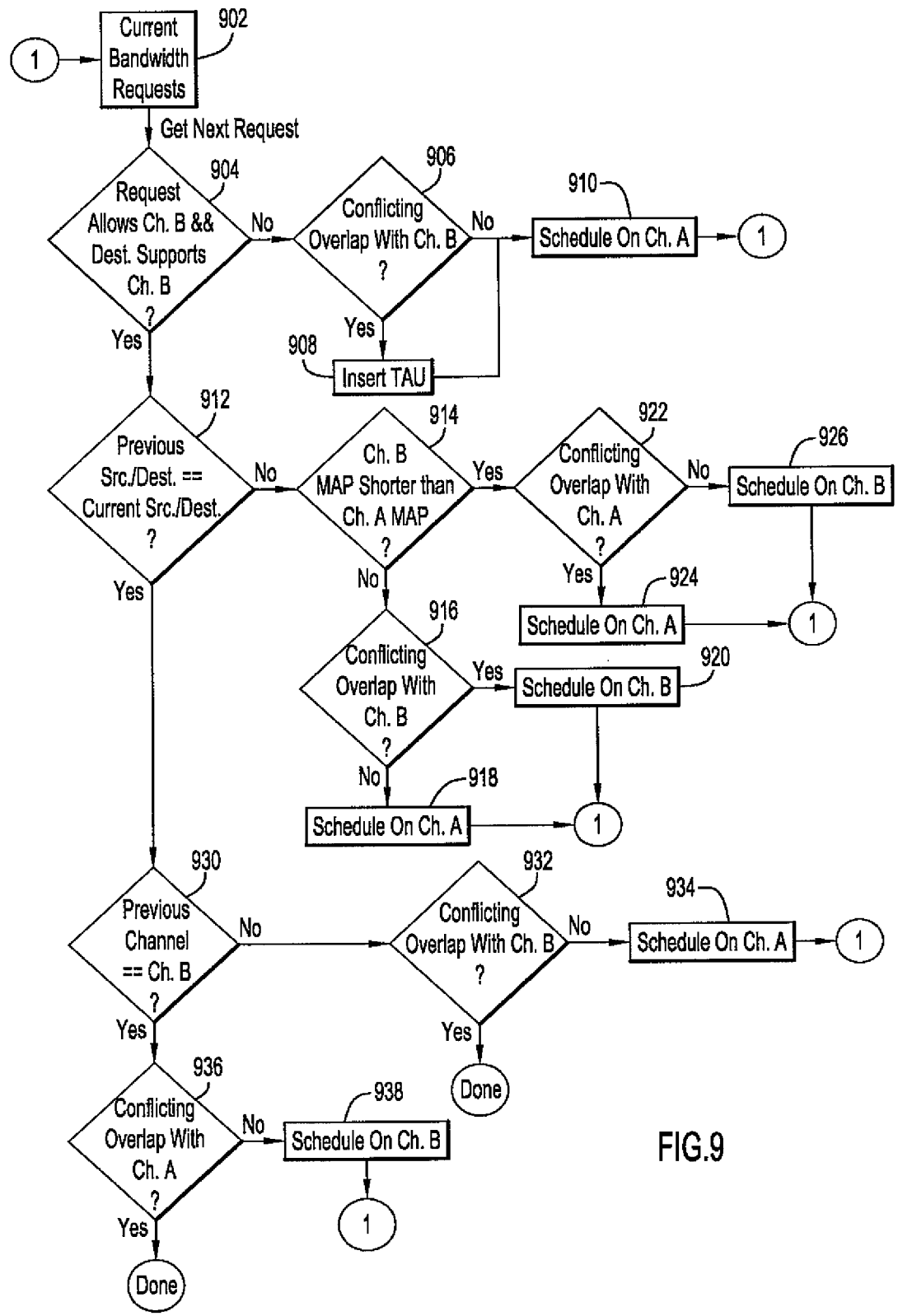
FIG. 9 shows a flow chart of a Packet Scheduling algorithm in accordance with the present invention.

FIG. 9 depicts a packet scheduling process that meets the conflict avoidance, bandwidth-request flexibility, and order-of-delivery requirements described in the preceding sections. As shown, the process begins at step 902 where current bandwidth requests are stored and a next reservation request (from, e.g., a queue) is analyzed. Specifically, at step 904 it is determined if the request allows channel B and whether the destination node supports channel B. A reservation request Protocol Information Element includes information to indicate whether the bandwidth request is exclusively for transmission on channel A, exclusively for transmission on channel B, or for transmission on either channel A or channel B at the NC's discretion. The latter two categories would "allow" for transmission on channel B, whereas the first category would not allow transmission on channel B. If not, then at step 906, it is determined whether there is a conflicting overlap with channel B. If there is a conflicting overlap, then at step 908 a Terminal Allocation Unit (TAU) is inserted. TAU is a term from the MoCA specification that describes time allocated by the MAP during which no transmissions occur. For Turbo MoCA, a TAU may be inserted either on channel A (via the normal MoCA protocol) or on channel B (using a custom MAP Protocol Information Element). After either step 906 or 908, step 910 schedules the communication on channel A. The process then returns to step 902.

If at step 904, the determination was positive, then at step 912 it is determined whether a previous source and destination node, and current source and destination node are the same. If not, then at step 914 it is determined whether the channel B MAP is shorter than the channel A MAP. More specifically, whether the channel A map cycle is currently shorter or longer than the channel B MAP cycle, consider the MAP generation process as stacking blocks into two piles. One goal of the algorithm is to keep the two piles (MAP cycles) as close to equal height (time duration) as possible, to maximize the throughput (number of frames transmitted over a given time interval). So when determining which channel's MAP cycle is shorter, it is determined whether the accumulated duration of frames scheduled for transmission on that channel is shorter than the accumulated duration of frames scheduled for transmission on the other channel. If the channel B MAP is not shorter than the channel A MAP, then it is determined at step 916 whether there is conflicting overlap with channel B. If not, then the communication is scheduled on channel A (step 918). If there is conflicting overlap with channel B, then the communication is scheduled on channel B (step 920). In either case, the process again returns to step 902.

If at step 914, the result was positive, then at step 922 it is determined whether there is a conflicting overlap with channel A. If yes, then the communication is scheduled on channel A (step 924), and if not the communication is scheduled on channel B (step 926). In either case, the process returns to step 902, as shown.

If at step 912, the result was positive, then it is determined at step 930 whether the previous channel was channel B. If not, then it is determined at step 932 whether there is conflicting overlap with channel B. If yes, the process ends. If not, the communication is scheduled on channel A (step 934) and the process returns to step 902.

If the result of step 930 is positive, then at step 936 it is determined whether there is conflicting overlap with channel A. If yes, the process ends. If not, then at step 938 the communication is scheduled on channel B (step 938) and the process returns to step 902.

Bandwidth Prediction

Ethernet packets to be transmitted across a MoCA network arrive at the MoCA MAC unannounced, i.e. the host device that presents Ethernet traffic to the MAC does so at will. Once each MAP cycle, the MoCA MAC must examine and prioritize all Ethernet traffic that is waiting to be transmitted and request bandwidth for such transmissions. There is latency associated with this bandwidth request mechanism and also with the bandwidth grant that is described in MAP packets from the NC. This latency necessitates buffering Ethernet packets at a level proportional to the rate at which they arrive from the host and inversely proportional to the rate at which they can be delivered across the MoCA network. The amount of memory dedicated to such buffering in a MoCA MAC can be significant.

If a goal of Turbo MoCA is to increase throughput of a particular MoCA device, then additional buffering demands are placed on that device. Such a goal might exist in the case of a video server that sends streams to a large number of destination nodes. Consider two independent MoCA devices operating in two independent MoCA networks. Each device achieves an equilibrium of occupied buffer memory depending on the rate at which Ethernet packets arrive from the host and are transmitted into the MoCA network. If these two MoCA devices are conceptually merged into a single Turbo MoCA device, transmitting on two separate frequencies, it can be seen that the total required buffer memory is the sum of what was required in the two separate devices. A simple analysis of the problem is therefore that doubling throughput via Turbo MoCA requires doubling the amount of buffer memory, assuming that both channels have equal PHY rates.

To reduce the cost associated with increasing buffer memory by such a large amount, a method called Bandwidth Prediction may be employed in accordance with the present invention. An underlying notion behind bandwidth prediction is that many types of traffic arrive from the host at predictable, paced rates. If it can be reliably predicted that a certain number of Ethernet frames will arrive from the host over a certain window of time, bandwidth to transmit such frames into the MoCA network can be requested prior to the arrival of such frames in a MoCA device's buffer memory. A correct bandwidth prediction therefore reduces the latency associated with the bandwidth request/grant mechanism, and thereby reduces the amount of buffer memory required to support a given throughput rate.

Figure 10:
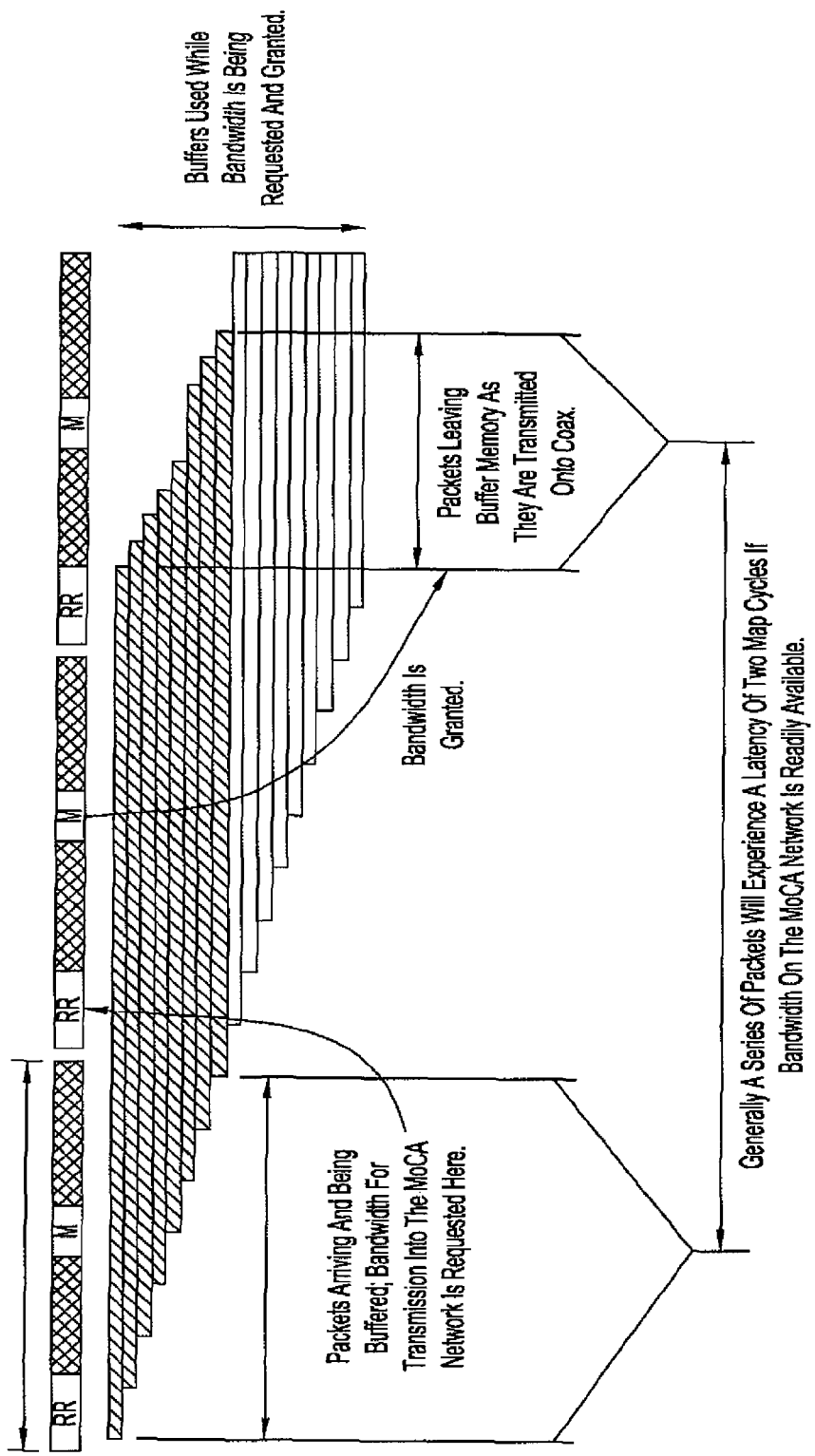
FIG. 10 depicts latency and memory buffer usage in a standard request/grant network.

FIG. 10 depicts a period of time in which packets arrive at a regular rate into a MoCA device and are buffered until a transmission time is scheduled by the Network Coordinator (NC). In this figure, RR designates a Reservation Request transmission to the NC at the beginning of a MAP cycle, and M represents a MAP transmission from the NC. The RR transmission is used to request bandwidth on the MoCA network, and the MAP transmission grants this bandwidth request. The series of horizontal rectangles represent packets arriving from an external interface and being placed into a MoCA device's memory buffer. The amount of time spent in the memory buffer is depicted by the length of the rectangle, and the number of occupied buffers is indicated by the number of rectangles stacked vertically. When a packet is placed into a MoCA buffer, the next RR transmission opportunity is used to request bandwidth to transmit that packet. The subsequent MAP frame then grants the bandwidth request and assigns a transmission time to the requesting node some time in the following MAP cycle. In general, traffic arriving at a regular rate in such a system experiences a latency of two map cycles, and the required buffer depth is slightly larger than the number of packets that are placed into the buffer over the course of two map cycles.

Figure 11:
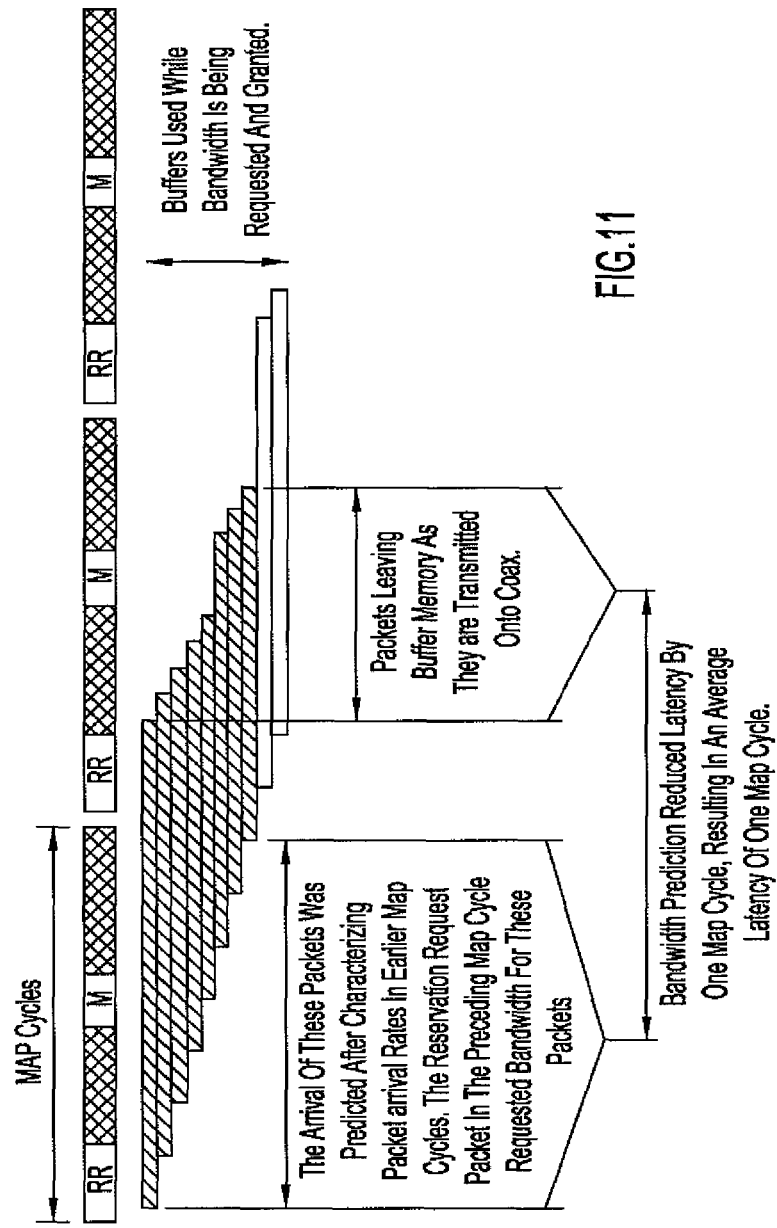
FIG. 11 depicts advantages of bandwidth prediction in a MoCA system in accordance with the present invention.

FIG. 11 depicts the advantages of bandwidth prediction in a MoCA system with regard to reducing latency and memory buffer usage. When using bandwidth prediction, arrival of a stream of packets is anticipated, either because the packet arrival rate has been characterized by the MoCA system, or because the arrival rate has been communicated to the MoCA system by the traffic source. The Reservation Request packet RR requests bandwidth for the anticipated packets, and the following MAP frame M grants this bandwidth. As suggested by the length of the horizontal rectangles, the amount of time spent in the MoCA device's buffer memory is significantly reduced, as is the number of buffers required to maintain a given packet throughput. In general, packets experience a latency of one map cycle, and the required buffer depth is slightly larger than the number of packets that are placed into the buffer during a single map cycle.

As can be appreciated from the foregoing, Turbo MoCA cost-effectively increases throughput compared to a standard MoCA implementation by adding a modest amount of hardware, including Dual Tx PHY and RF paths and Dual Rx RF paths.

The extensions to the MoCA protocol that are employed to enable efficient use of Turbo MoCA are:

Channel Selection—determining a frequency of operation for the Turbo MoCA traffic;

Device Calibration—measuring and correcting for imperfections in the hardware used to transmit and receive on the Turbo MoCA frequency;

Channel Characterization—measuring the characteristics of the coaxial cable network at the Turbo MoCA frequency;

Bandwidth Prediction—detecting trends in traffic patterns and using such trends to predict bandwidth needs; and Packet Scheduling—assigning transmission bandwidth to efficiently take advantage of both the standard MoCA frequency and the Turbo MoCA frequency.

Packet scheduling for Turbo MoCA preferably includes:

Conflict Avoidance—ensuring no node is requested to receive on both the standard and turbo MoCA frequencies simultaneously;

Bandwidth Request Flexibility—allowing the Network Coordinator to determine the frequency on which each transmission occurs; and Order of Delivery Maintenance—eliminating ambiguity with regard to the order in which packets arrive at a destination MoCA node.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

We claim:

1. A method comprising:
constructing a reservation request frame comprising a series of request elements at a first multimedia over coax alliance (MoCA) implementation, wherein each of the series of request elements comprises details of a transmission opportunity being requested, wherein the MoCA implementation comprises a single Receive (Rx) physical (Phy) module that is arranged to receive data via one of at least two Rx radio frequency (RF) modules, which are arranged to be in communication with a coaxial cable, wherein a first one of the Rx RF modules is configured to operate at a first frequency on a first channel (channel A), and a second one of the Rx RF modules is configured to operate at a second frequency on a second channel (channel B), the MoCA implementation further comprising at least two transmit (Tx) Phy modules respectively arranged to be in communication with two Tx RF modules, which are also arranged to be in communication with the coaxial cable; and
transmitting the reservation request, wherein a bandwidth is reserved at least in part by a reservation request protocol information element (PIE), wherein transmitting the reservation request comprises:
determining a first duration of packet as transmitted on channel A and a second duration of packet as transmitted on channel B, and
transmitting the reservation request comprising the bandwidth corresponding to longer of the first duration and the second duration, wherein transmitting the reservation request further comprises transmitting, in the reservation request PIE, an indication whether the bandwidth request is for transmission on at least one of the following: exclusively on channel A, exclusively on channel B, and on either of channel A or channel B.

2. The method of claim 1, wherein channel A and channel B occupy different frequency bands.

3. The method of claim 2, wherein the transmission opportunity details comprise: a duration, a destination node, a priority, and a packet type to be transmitted.

4. The method of claim 3, wherein the duration is determined by factoring a number of bytes to be transmitted and one or more details of an Adaptive Constellation Multi-Tone (ACMT) modulation to be used for transmission.

5. The method of claim 3, wherein reservation request is operable to prepare the MoCA node to transmit on either channel A or channel B, but not on both simultaneously.

6. The method of claim 5, further comprising determining at a network controller whether the MoCA node will transmit on channel A or channel B.

7. The method of claim 6, further comprising:
detecting trends in traffic patterns; and
predicting bandwidth needs based on the detected trends.

8. A method comprising:
calculating a duration of a packet as transmitted on both a channel A and a channel B;
using the duration that is longer in time within a bandwidth request;
transmitting the bandwidth request in a MoCA network, wherein the bandwidth is requested at least in part by a reservation request protocol information element (PIE); and
granting bandwidth in response to the bandwidth request using a Medium Allocation Plan (MAP) PIE, wherein granting the bandwidth comprises:
receiving a first duration of packet as transmitted on channel A and a second duration of packet as transmitted on channel B,
receiving, in the reservation request PIE, an indication whether the bandwidth request is for transmission on at least one of the following: exclusively on channel A, exclusively on channel B, and on either of channel A or channel B, and
granting the bandwidth corresponding to longer of the first duration and the second duration.

9. The method of claim 8, wherein the PIE allows communication of profile sequence information for each of channel A and channel B.

10. The method of claim 8, further comprising using both calculated durations of the packet as transmitted within the bandwidth request.

11. The method of claim 10, further comprising introducing a new inefficiency value to construct the bandwidth request.

12. The method of claim 8, wherein the MAP PIE is ignored by network devices that do not understand a vendor-defined purpose of the MAP PIE.

13. The method of claim 12, wherein the MAP PIE is transmitted as part of a standard MAP packet on channel A.

14. The method of claim 9, wherein channel A and channel B occupy different frequency bands.

15. An apparatus comprising:
- a MoCA implementation comprising a single Receive (Rx) physical (Phy) module that is arranged to receive data via one of at least two Rx radio frequency (RF) modules, which are arranged to be in communication with a coaxial cable, wherein a first one of the Rx RF modules is configured to operate on a first channel (channel A), and a second one of the Rx RF modules is configured to operate on a second channel (channel B);
- at least two transmit (Tx) Phy modules respectively arranged to be in communication with two Tx RF modules, which are also arranged to be in communication with the coaxial cable, wherein the first channel and the second channel are defined as distinct frequency bands on a single coaxial network, and the second channel is calibrated using an already-calibrated first channel calibrated in accordance with conventional MoCA;
- a memory; and
- a processor configured to execute instruction stored in the memory, the instructions comprising:
  - calculating a duration of a packet as transmitted on both a channel A and a channel B;
  - using the duration that is longer in time within a bandwidth request;
  - transmitting the bandwidth request in a MoCA network, wherein the bandwidth is requested at least in part by a reservation request protocol information element (PIE); and
  - granting bandwidth in response to the bandwidth request using a Medium Allocation Plan (MAP) PIE, wherein granting the bandwidth comprises:
    - receiving a first duration of packet as transmitted on channel A and a second duration of packet as transmitted on channel B,
    - receiving, in the reservation request PIE, an indication whether the bandwidth request is for transmission on at least one of the following: exclusively on channel A, exclusively on channel B, and on either of channel A or channel B, and
    - granting the bandwidth corresponding to longer of the first duration and the second duration.

16. The apparatus of claim 15, wherein the apparatus is embedded in a set top box.

17. The apparatus of claim 16, wherein the instructions further comprise:
- on a first single device implementing multimedia over coax (MoCA), selecting both a first channel and a second channel among a plurality of possible channels in a single MoCA network;
- simultaneously transmitting a first data stream over the first channel and a second data stream over the second channel; and
- receiving the first data stream by a second device implementing MoCA and receiving the second data stream by a third device implementing MoCA.

18. The apparatus of claim 17, wherein the instructions further comprise: calibrating the first channel and the second channel.

19. The apparatus of claim 18 wherein the instructions further comprise calibrating the second channel using the first channel after the first channel is already calibrated.

20. The method of claim 18, wherein the instructions further comprise performing channel characterization for each of the first channel and the second channel.

* * * * *